United States Patent [19]

Fields

[11] 4,397,343

[45] Aug. 9, 1983

[54] LOG SCANNING IN VENEER LATHE TO DETERMINE OPTIMUM YIELD AXIS

[75] Inventor: Fred W. Fields, Painesville, Ohio

[73] Assignee: The Coe Manufacturing Co., Painesville, Ohio

[21] Appl. No.: 298,183

[22] Filed: Aug. 31, 1981

[51] Int. Cl.³ .............................................. B27L 5/02
[52] U.S. Cl. .................................... 144/209 A; 82/45; 250/560; 356/384; 144/357
[58] Field of Search ............... 144/209 R, 209 A, 356, 144/357; 235/454; 82/45, 2.5; 250/560, 201, 206; 356/384, 386, 387, 356

[56] References Cited

U.S. PATENT DOCUMENTS

| | | | |
|---|---|---|---|
| 3,852,579 | 12/1974 | Sohn et al. | 235/151.3 |
| 3,992,615 | 11/1976 | Bennett et al. | 235/151.32 |
| 4,197,888 | 4/1980 | McGee et al. | 144/209 A |
| 4,221,973 | 9/1980 | Nosler | 250/560 |
| 4,246,940 | 1/1981 | Edwards et al. | 144/209 A |
| 4,335,763 | 6/1982 | McGee | 144/209 A |

Primary Examiner—W. D. Bray
Attorney, Agent, or Firm—Klarquist, Sparkman, Campbell, Leigh, Whinston & Dellett

[57] ABSTRACT

Apparatus is disclosed for scanning a log with light or other electromagnetic radiation while such log is rotated by the spindles of a veneer lathe to determine its optimum yield axis and for positioning the log with positioning arms to align such optimum yield axis with the lathe spindle axis. The scanning means detects light reflected from the log or light transmitted past the side of a log to determine its optimum yield axis. The positioning arms are mounted on support arms having a horizontal sliding pivot at one end thereof to provide vertical and horizontal adjustment of the positioning arms in response to positioning motors. The positioning motors move the positioning arms to align the optimum yield axis of the log with the lathe spindle axis and are controlled by the output of a computer which determines the optimum yield axis.

21 Claims, 7 Drawing Figures

LOG SCANNING IN VENEER LATHE TO DETERMINE OPTIMUM YIELD AXIS

BACKGROUND OF INVENTION

The subject matter of the present invention relates generally to apparatus for scanning a log to determine its optimum yield axis and positioning the log with its optimum yield axis in alignment with the spindle axis of a veneer lathe. In particular the invention relates to such an apparatus in which the log is scanned by light or other electromagnetic radiation while such log is rotated by the veneer lathe spindles to determine its optimum yield axis and is thereafter positioned by positioning arms to align such optimum yield axis with the lathe spindle axis before peeling sheets of wood veneer from the log with a lathe knife.

Previously it has been proposed in U.S. Pat. No. 3,852,579 granted Dec. 3, 1974 to Sohn et al to determine the optimum yield axis of a log by scanning such log with light beams while the log is rotated in a lathe charger mechanism about spindles which are spaced from the veneer lathe spindles or chucks. Then the lathe charger spindles are moved vertically and horizontally to align the optimum yield axis of the log with a reference axis before transfer to the lathe axis. This has a disadvantage that separate lathe charger spindles and drive motors are required in addition to those used in the veneer lathe. In addition, this scanning during rotation on lathe charger spindles requires a particular type of lathe charger which is not used for many existing lathe apparatus.

In the apparatus of the present invention the log is only rough centered in the lathe charger and then transferred from the lathe charger to the lathe spindles before scanning. Thus, scanning of the log to determine its optimum yield axis is done in the lathe by rotating the log with the lathe spindles. After the optimum yield axis of the log is determined, positioning arms engage the opposite ends of the log and adjust the position of the log to align such optimum yield axis with the lathe spindle axis. Then the lathe spindles reengage the log and such log is rotated while sheets of wood veneer are peeled from the log by the lathe knife. This simplified apparatus results in considerable cost savings.

A log may be scanned by relfecting a light beam from the rotating log to a photoelectric detector to determine the log's optimum yield in the manner of U.S. Pat. No. 3,852,579 of Sohn et al and U.S. Pat. No. 3,992,615 of Bennett et al granted Nov. 16, 1976. Alternatively, it may also be desirable to scan the log by transmitting a light beam past the side of the log to a photodetector positioned on the opposite side of the log from the light source as shown in U.S. Pat. No. 4,197,888 to McGee et al granted Apr. 15, 1980. However, unlike the present invention in all of these prior art patents scanning of the log to determine its optimum yield axis takes place in the lathe charger not on the lathe spindles. In addition, the log is positioned to align its optimum yield axis into a reference position spaced a predetermined distance from the lathe axis, by horizontal and vertical (X-Y) movement of the lathe charger spindles. This requires a complicated and expensive mechanism for adjusting the lathe charger spindles in both vertical and horizontal directions while enabling rotation of such spindles by maintaining them coupled to the drive motors. This problem is avoided in the apparatus of the present invention without X-Y movement of the lathe spindles used for scanning, by employing positioning arms separate from the lathe spindles for adjustment of the log to align its optimum yield axis.

The log scanning and positioning apparatus of the present invention is more versatile than that of the cited patents in that it enables the use of any lathe charger since all scanning and positioning takes place in the lathe, not in the charger. In addition, the present invention enables the scanning and positioning apparatus to be pretested as a unit for accuracy at the manufacturer before installation which is not possible when scanning takes place in the charger.

It has previously been proposed in U.S. Pat. No. 4,246,940 of Edwards et al granted Jan. 27, 1981 to provide a veneer lathe charger apparatus in which the length and position of a transfer arm is adjusted in order to position the log with its optimum yield axis in alignment with the lathe axis after scanning such log in the lathe charger. Thus, this patent is similar to those described above in that it employs lathe charger spindles to rotate the log during scanning to determine the optimum yield axis of such log. However, it differs in that there is no X-Y movement of the charger spindles to adjust the position of the log. Instead, this X-Y movement is produced by pivoting the transfer arm while adjusting the length of such arm.

When light scanning is employed to determine the optimum yield axis of the log, it is preferable to employ a photo detector in the form of a linear array of photo diodes as shown in U.S. Pat. No. 4,221,973 of Nosler granted Sept. 9, 1980. However, other types of photoelectric detectors can also be employed.

SUMMARY OF INVENTION

It is therefore an object of the present invention to provide an improved log scanning and positioning apparatus of reduced cost for determining the optimum yield axis of the log and positioning such optimum yield axis in alignment with a work axis.

Another object of the invention is to provide such a log scanning and positioning apparatus in which the optimum yield axis of the log is determined by scanning such log with light or other electromagnetic radiation while the log is rotated on veneer lathe spindles.

A further object of the invention is to provide such a log scanning and positioning apparatus which is more versatile in that it can be used with any type of lathe charger apparatus.

An additional object of the invention is to provide such a log scanning and positioning apparatus in which the log is moved by positioning arms after scanning to align its optimum yield axis with the veneer lathe axis.

Still another object of the invention is to provide such a log scanning and positioning apparatus which can be pretested for accuracy during manufacturing before such apparatus is installed at the plant of a customer.

A still further object of the invention is to provide such an improved log positioning and scanning apparatus in which the positioning arms are moved both vertically and horizontally by support arms mounted on a horizontal sliding pivot for accurate adjustment of the positioning arms in a simple and inexpensive manner.

DESCRIPTION OF DRAWINGS

Other objects and advantages of the present invention will be apparent in the following detailed description of a preferred embodiment thereof and from the attached drawings of which.

DESCRIPTION OF PREFERRED EMBODIMENT

Figure 1:
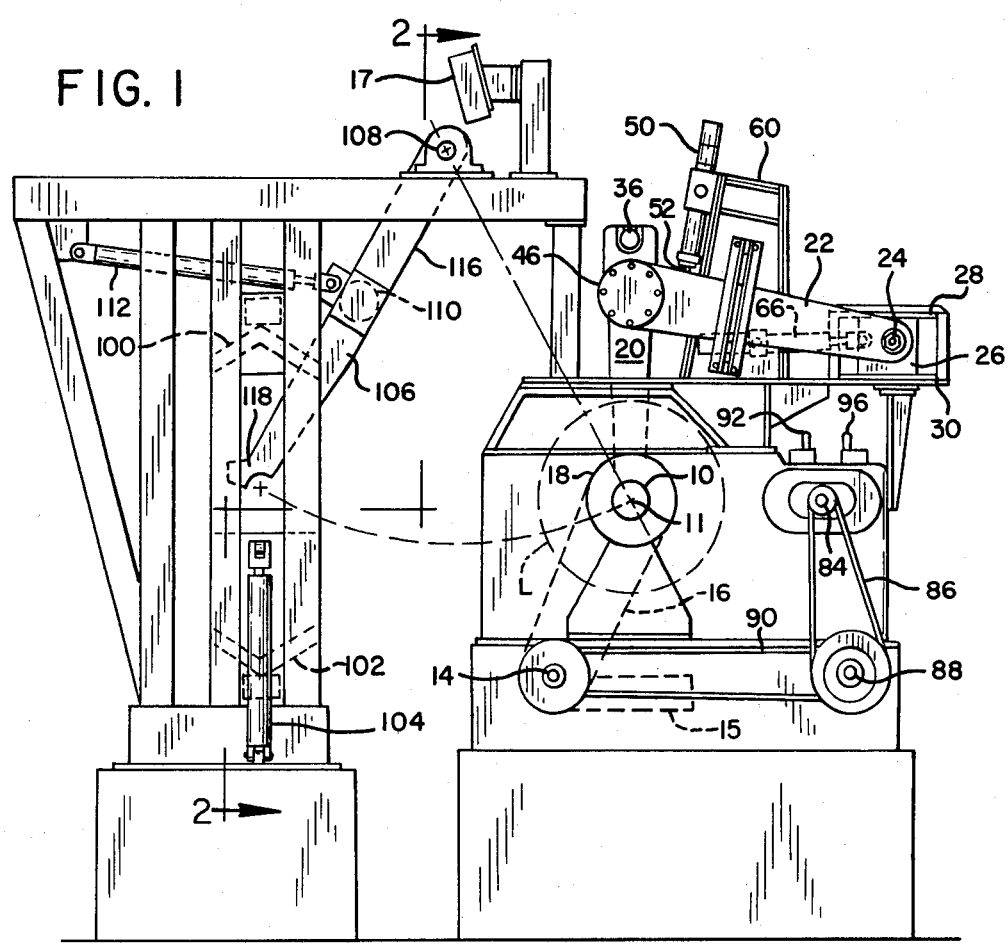
FIG. 1 is a side elevational view of the lathe apparatus of the present invention.
Figure 2:
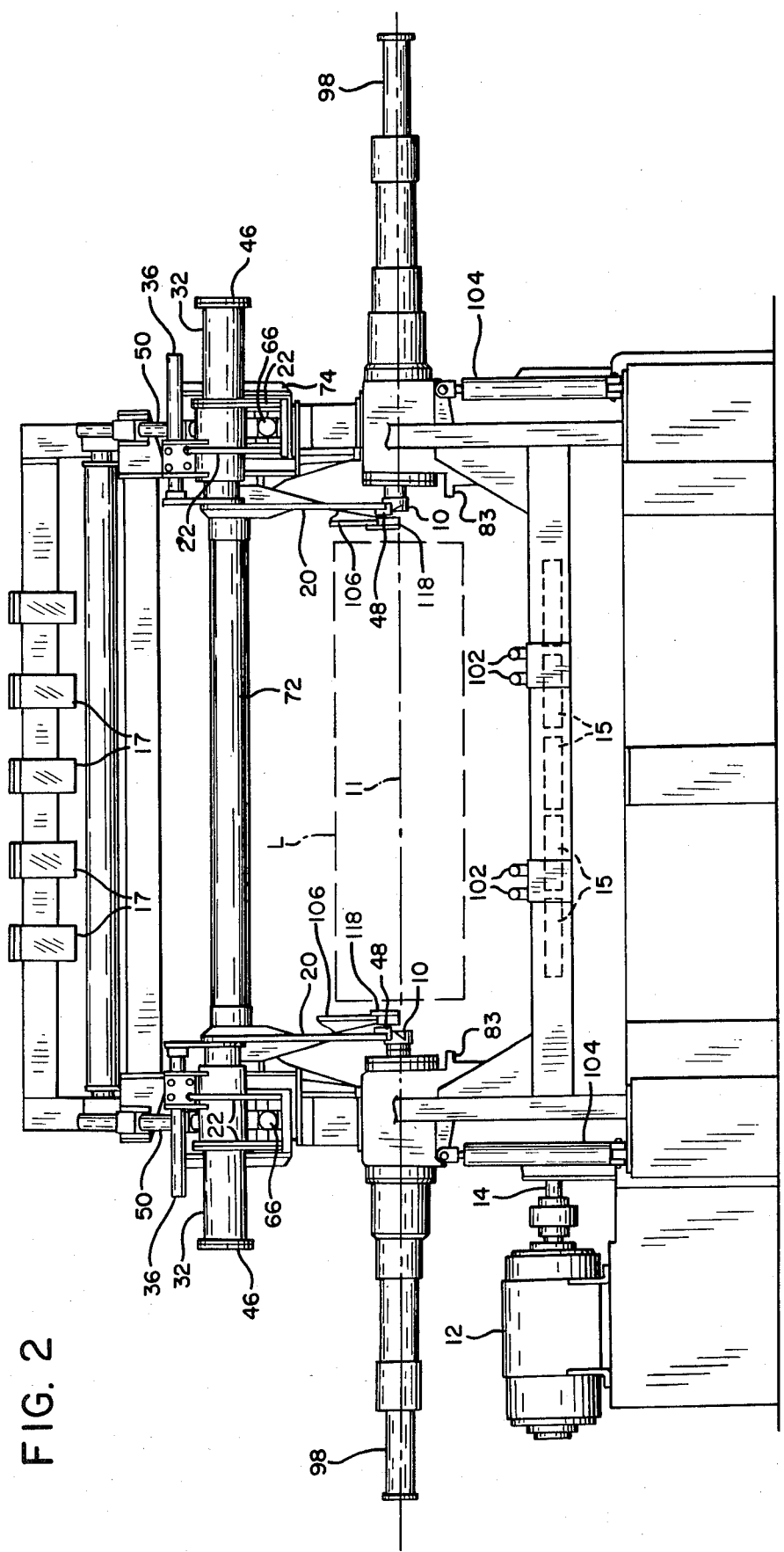
FIG. 2 is a front elevation view of the lathe apparatus of FIG. 1 taken along line 2—2 of FIG. 1.
Figure 3:
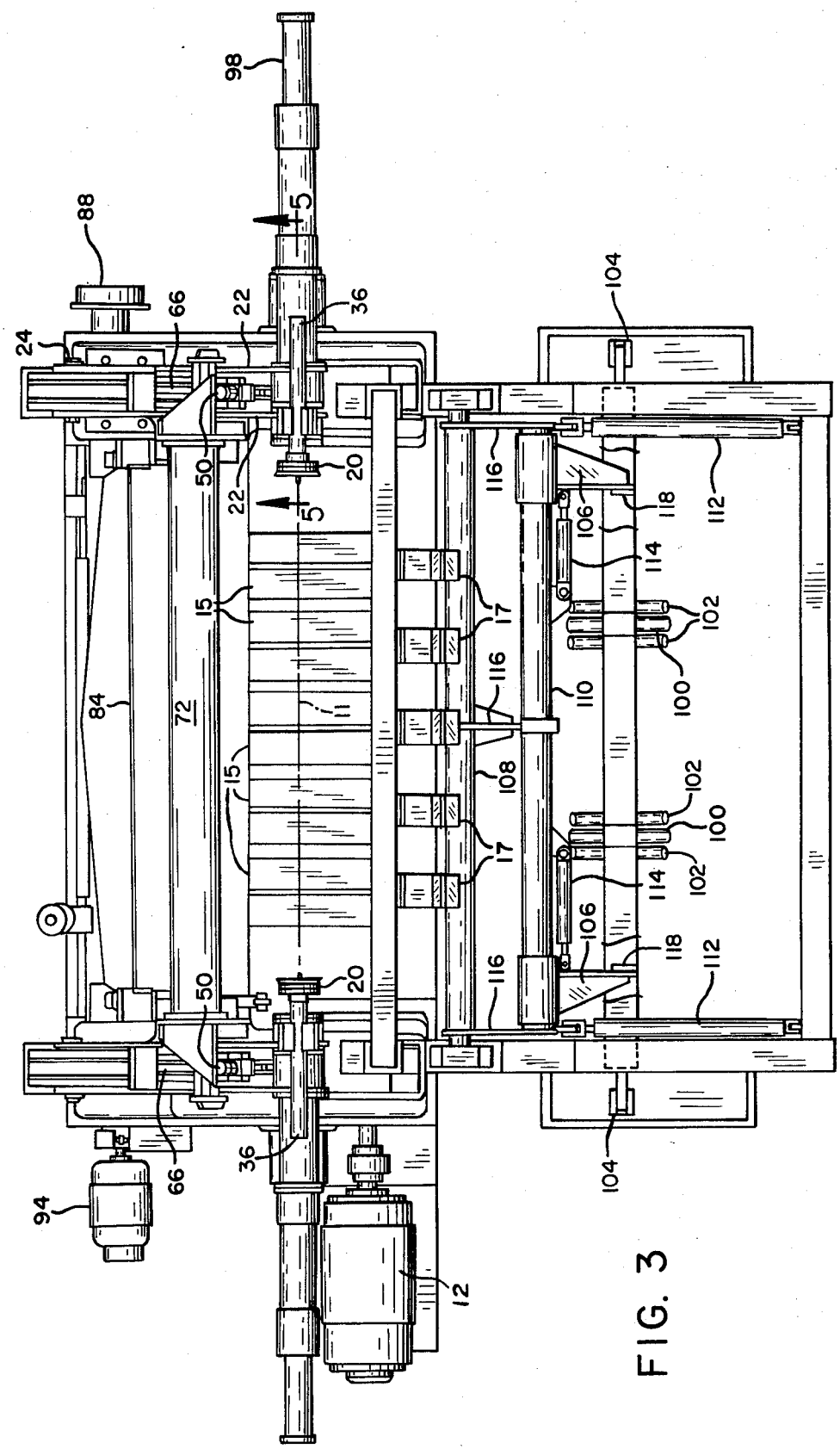
FIG. 3 is a plan view of the apparatus of FIGS. 1 and 2.

As shown in FIGS. 1-3 the log scanning and positioning apparatus of the present invention is preferably used in a veneer lathe apparatus having a pair of lathe spindles 10 which engage the opposite ends of a log L from which sheets of wood veneer are peeled. The spindles are rotated about a spindle axis 11 by a lathe motor 12 whose output shaft 14 is coupled to each of the lathe spindles 10 by means of a drive chain 16 and chain socket 18 which are keyed to the spindle shafts. The optimum yield axis of the log L is determined by scanning the log with light or other electromagnetic radiation in the manner of U.S. Pat. No. 4,197,888 of McGee et al. The log is scanned by a plurality of light beams 13 emitted from five light sources 15 spaced longitudinally along such log as the log is rotated by the lathe spindles. The portion of the light beam transmitted past the side of the log is detected by five photodetectors 17 which may be cameras containing a linear array of PN junction diodes.

Figure 4:
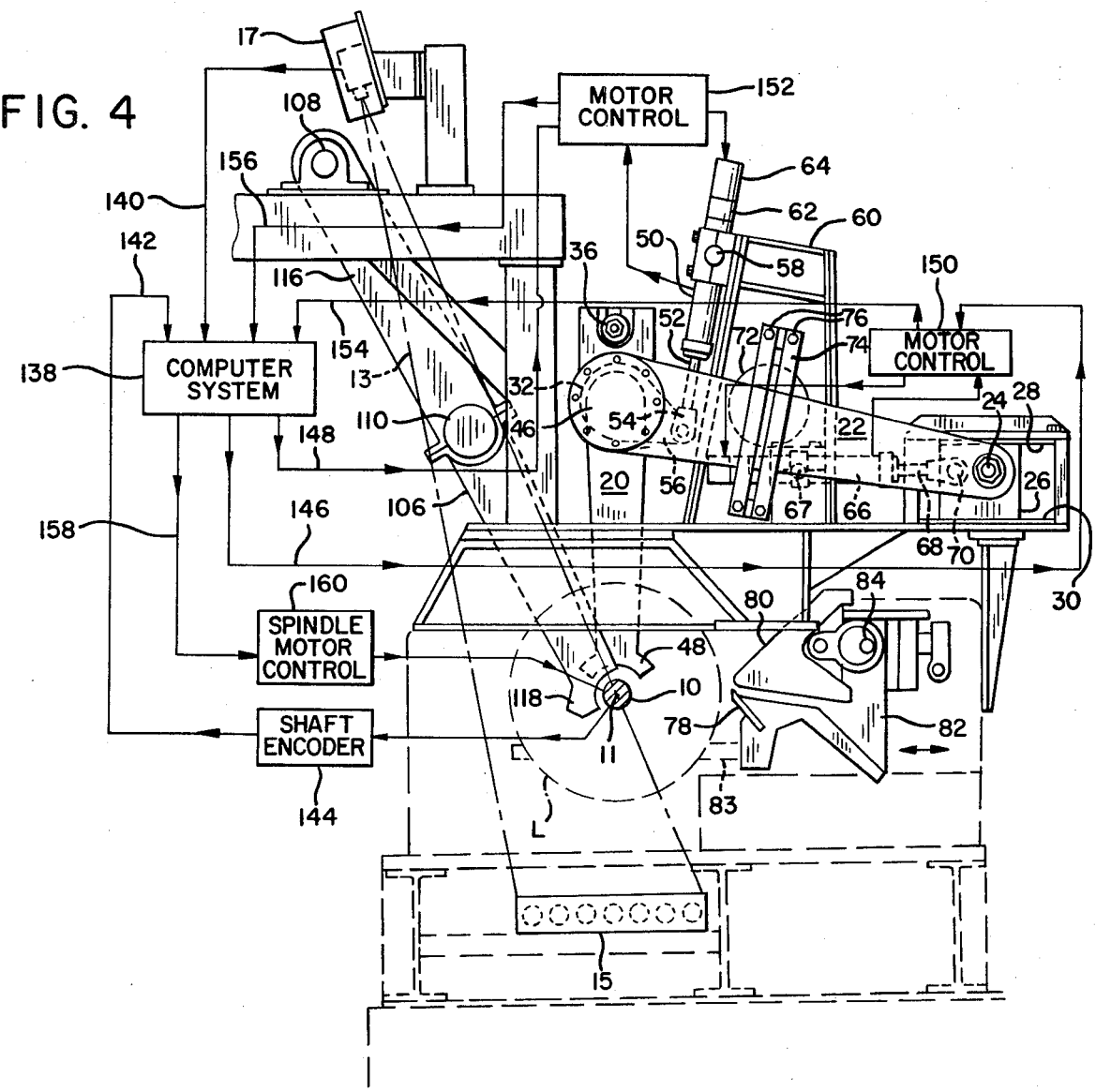
FIG. 4 is an enlarged view of a portion of FIG. 1 with parts broken away and a block diagram of a computer control system.
Figure 5:
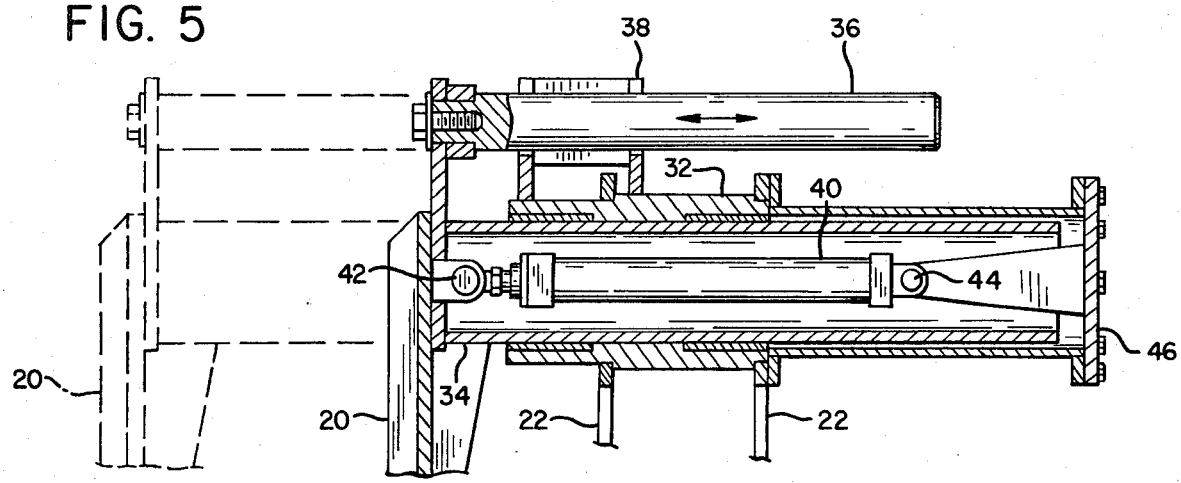
FIG. 5 is an enlarged horizontal section view taken along line 5—5 of FIG. 3.

A pair of positioning arm 20 of fixed length are each supported adjacent to the lathe spindles 10 on a pair of support arms 22 which are mounted for vertical pivoting at one end thereof on horizontal sliding pivot 24. Each of the positioning arms 20 is supported by a pair of support arms 22 of fixed length which are pivotally attached at pivot 24 on one end thereof to the opposite sides of a slide block 26. The slide block is mounted for horizontal sliding movement between an upper guide 28 and a lower guide 30 as shown in FIG. 4. The other ends of the support arm 22 are fixedly attached to the positioning arm 20 as shown in FIG. 5.

A guide rod 36 attached at one end to the positioning arm 20 extends through openings in a guide member 38 attached to the support lathe 32. As a result, the guide rod 36 prevents rotation of the positioning arm 20 relative to the support arms 22, but permits longitudinal movement of the positioning arm relative to the support arms 22 along the lathe spindle axis 11 by tube 34 sliding in sleeve 32. Longitudinal movement of the positioning arms 20 into the clamped position 20' where they engage the opposite ends of the log is shown in FIG. 5. This is accomplished by means of a clamp cylinder 40 within sleeve 32 having its piston rod attached by a pivot connection 42 to the positioning arm 20 and having the opposite end of the cylinder attached by pivot connection 44 to a fixed support plate 46 secured to the support sleeve 32. The slide tube 34 extends within the support sleeve 32 around the clamp cylinder 40 and supports the positioning arm 20 on such support sleeve.

When the positioning arm 20 is moved longitudinally along the lathe spindle axis by the clamp cylinder 40 an arcuate gripping portion 48 at the lower end of such arm engages the end of the log at a position radially spaced from the lathe spindles 10. Thus, the positioning arms 20 engage the log after the log is scanned to determine the optimum yield axis of the log. The positioning arms then move the log vertically and horizontally in order to align the optimum yield axis of the log with the lathe spindle axis 11.

Vertical movement of the positioning arm 20 is accomplished by vertical pivoting of the support arms 22 about pivot 24 with a vertical positioning motor 50. The positioning motor 50 may be in the form of a liquid operated cylinder whose piston rod 52 is attached at a pivot connection 54 between a pair of flanges 56 attached to the support sleeve 32. Thus, the positioning arm 20 and support arms 22 are supported entirely by the vertical positioning motor 50 which is pivotally mounted at pivot 58 to a support frame 60.

The vertical positioning motor 50 is controlled by a servo valve 62 which controls the flow of liquid to the opposite ends of the cylinder to control the position of the piston therein. A ball screw is provided within the cylinder to be rotated by a ball nut on the piston in response to movement of such piston, and the ball screw closes the servo valve when the piston has moved the positioning arm to the proper position corresponding to the optimum yield axis. One suitable vertical positioning motor is manufactured under model name LS-300 by Olsen Controls, Inc. of Bristol, Connecticut. A step motor 64 operates the servo valve in response to a motor control which is controlled by an electrical output signal of a digital computer in the manner shown in FIG. 9 of U.S. Pat. No. 4,197,888 of McGee et al.

Horizontal movement of the positioning arm 20 is accomplished by sliding the block 26 attached to the pivot 24 of the support arms 22 along guides 28 and 30 by means of a horizontal positioning motor 66 which is mounted by a pivot connection 70 to frame 60. The horizontal positioning motor is identical in construction and operation to the above described vertical positioning motor. The piston rod 68 of the positioning motor 66 is connected at a pivoted connection 70 to the slide block 26 in order to move the sliding pivot 24.

In many causes a backup roll is employed for providing support to the log intermediate its ends during peeling and such backup roll may be powered to provide additional torque for turning the log. For purposes of clarity no such backup roll has been shown. However, a support beam 72 for the backup roll apparatus extends between the frames 60 for the two positioning arms 20 and support arms 22 to provide additional support for such frames which prevent inward lateral movement of the support arms. In addition, a retainer plate 74 is provided on the opposite side of the support arms 22 from the frame 60 and support beams 72 and attached to frame 60 by means of mounting bolts 76, in order to retain the support arms 72 against outward lateral movement.

A veneer lathe knife 78 and pressure bar 80 are mounted on a knife carriage 82 which slides horizontally on guide rails 83 in response to rotation of a carriage drive shaft 84, as shown in FIG. 4. The carriage drive shaft 84 is connected by a drive chain 86 to a knife advance clutch 88 which in turn is connected by a drive chain 90 to the drive shaft 14 of the lathe motor 12, as shown in FIG. 1. Thus, when the knife carriage is to be advanced the clutch 88 is engaged by a conventional lather control system to cause rotation of the drive shaft 84 which advances the carriage toward the log L. The knife carriage 82 is retracted rapidly away from the log to enable loading of another log into the lathe by means of a separate retraction motor 94, shown in FIG. 3. Peel thickness is controlled by the gear ratio shaft 84 and the knife carriage 82 and is adjusted with gear change levels 92 and 96.

The lathe spindles 10 are moved into and out of engagement with the opposite ends of the log by means of a pair of spindle cylinders 98 in a similar manner to that shown in U.S. Pat. No. 4,197,888. The spindle advice and retract cylinders 98 are controlled automatically by the digital computer so that the spindles engage the ends of the log immediately prior to and during scanning to rotate such log. After scanning is completed the opposite ends of the log are engaged by the positioning arms 20 and the lathe spindles are retracted. Then the positioning arms 20 are moved by the vertical positioning motors 50 and the horizontal positioning motors 66 to adjust the position of the log so that its optimum yield axis is in alignment with the lathe spindles axis 11. After such axis alignment the spindles again are clamped into engagement with the opposite ends of the log and the positioning arms disengage from the log. Then the log is rotated by the spindles and the knife carriage is advanced until the knife blade engages the side of the log to peel wood veneer from the log. The knife blade is advanced at a predetermined rate to control the thickness of the veneer and this continues until the log is peeled to a relatively small diameter on the order of about 6 inches. At this point peeling is stopped, the knife carriage is retracted, and the lathe spindles are disengaged to drop the log core. A new log is then moved by a lathe charger into position to be engaged by such spindles. This completes one cycle.

Before a new log is moved into the lathe such log is rough centered in the lathe charger by means of pairs of upper and lower V-clamps 100 and 102 which are moved into engagement with the log by means of two actuating cylinders 104 at the opposite sides of the lathe charger. It should be noted that the upper V-clamps 100 are coupled to the lower V-clamps 102 so that movement of both the upper and lower V-clamps is accomplished by means of a single cylinder 104. After rough centering, the log is engaged by a pair of transfer arms 106 which are pivoted at their upper ends on a support beam 108 to transfer the log to the lathe spindles 10. The transfer arms are slid longitudinally along a guide beam 110 which is secured to the support beam 108 for pivotal rotation therewith.

A pair of transfer cylinders 112 are provided for moving each of the transfer arms 106 from the rough center position to the lathe axis position. The transfer arms are moved into and out of engagement with the ends of the log by sliding such arms along guide beam 110 by means of clamp cylinders 114. The guide beam 110 and the transfer arm 106 are supported on the support beam 108 by means of support plates 116 at the opposite ends thereof and intermediate such ends which connect beam 110 to beam 108 as shown in FIG. 3. As a result, the guide beam 110, support plates 116, and transfer arms 106 are all pivoted with the support beam 108 about the axis of such support beam by the transfer cylinders. Transfer arms 106 are provided with arcuate gripping portions 118 at the lower end thereof for enabling the lathe spindles to engage the log while such gripping portions are holding the log adjacent the lathe axis 11.

Figure 6:
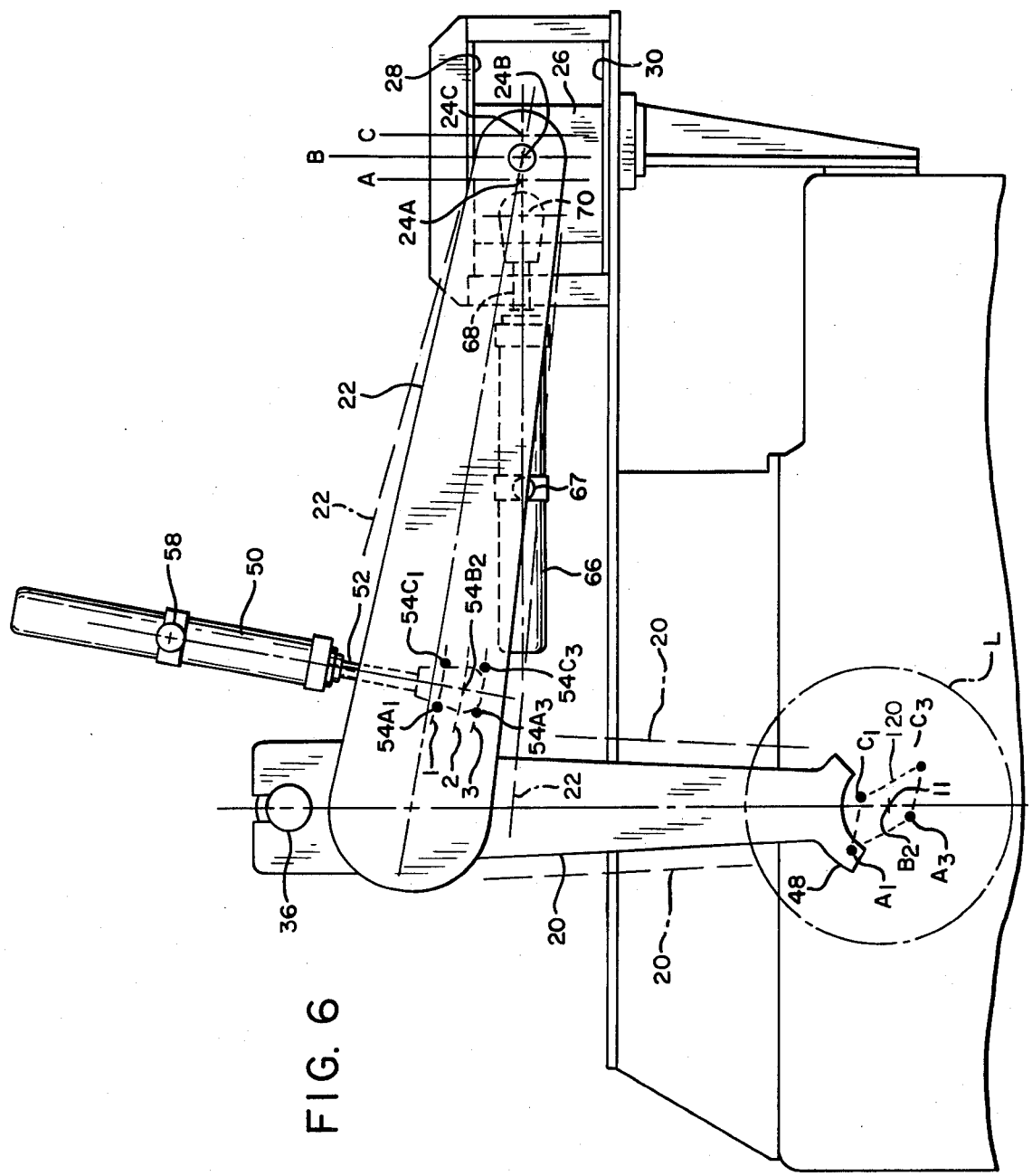
FIG. 6 is an enlarged vertical section view similar to FIG. 4 with parts removed for clarity, showing the different positions of the positioning arm for alignment of the optimum yield axis of the log with the lathe spindle axis.

The X-Y movement of the positioning arms 20 by the positioning motors 50 and 66 over an adjustment region 120 is shown in FIG. 6. The vertical positoning motor 50 moves its piston rod 52 to pivot the support arms 22 about pivot 24 to provide the vertical adjustment of such positioning arms. As a result, the pivot connection 54 at the end of piston rod 52 is moved between an upper limit vertical position 1 and a lower limit vertical position 3. Such pivot connection occupies an intermediate vertical position 2 when the scanning axis of the log also turns out to be in the same vertical position as the optimum yield axis of the log. In addition, the positioning arm 20 is moved horizontally by the horizontal positioning motor 66 which slides the pivot 24 for the support arms 22 horizontally between left limit position 24A and right limit position 24C. In the position of the support arms 22 shown in FIG. 6, the pivot 24 is slid to an intermediate horizontal position 24B when the scanning axis of the log is also at its optimum yield axis. In the scanning position the positioning arm 20 engages the log with the gripping portion 48 so that the center of the radius of curvature of its arcuate bottom edge coincides with the lathe spindle axis 11 at the B-2 position shown in FIG. 6. This B-2 position of the arm 20 is achieved when the horizontal and vertical positioning motors 66 and 50 locate the piston rod connection 54 at horizontal position B and vertical level 2.

When the optimum yield axis of a log is displaced from its scan axis, the positioning arm 20 is moved vertically by vertical positioning motor 50 and horizontally by horizontal positioning motor 66 to cause the center of the radius of curvature of the curved gripping portion 48 to move from B-2 to another position in the adjustment region 120. This adjustment zone 120 is bounded by an upper left hand corner at position A-1, a lower left hand corner at position A-3, an upper right hand corner at position C-1 and a lower right hand corner at position C-3. The corner positions A-1 and A-3 of the adjustment zone 120 correspond to the positions $54A_1$ and $54A_3$ of the piston pivot 54, respectively, at its upper limit level 1 and lower limit level 3 when pivot 24 is at its left end position A. Similarly, corner positions C-1 and C-3 of the adjustment region 120 correspond to the upper and lower limit right end positions $54C_1$ and $54C_3$ of piston pivot 54 at its upper limit level 1 and lower limit level 3 when pivot 24 is at its right end position C. Thus, it can be seen that in a relatively simple and inexpensive manner by pivoting about sliding pivot 24 the positioning arm 20 can move the opposite ends of the log in the horizontal and vertical directions (X-Y) to align the measured optimum yield axis of the log with the lathe spindle axis 11. It should be noted that the positioning motors 50 and 66 are both pivotally supported at pivots 58 and 67, respectively, in order to accommodate the pivoting and sliding motion of the positioning arm 20 and support arms 22. As a result of motor 50 pivoting about pivot 58 the vertical position paths 1, 2 and 3 of the piston pivot 54 are curved with their center of curvature at 58. Also, it should be noted that the horizontal sliding pivot 24 is mounted on the slide block 26 that slides along upper and lower guides 28 and 30 which confine its horizontal movement to a straight line in response to adjustment of the piston rod 68 connected to such slide block at connection 70.

Figure 7:
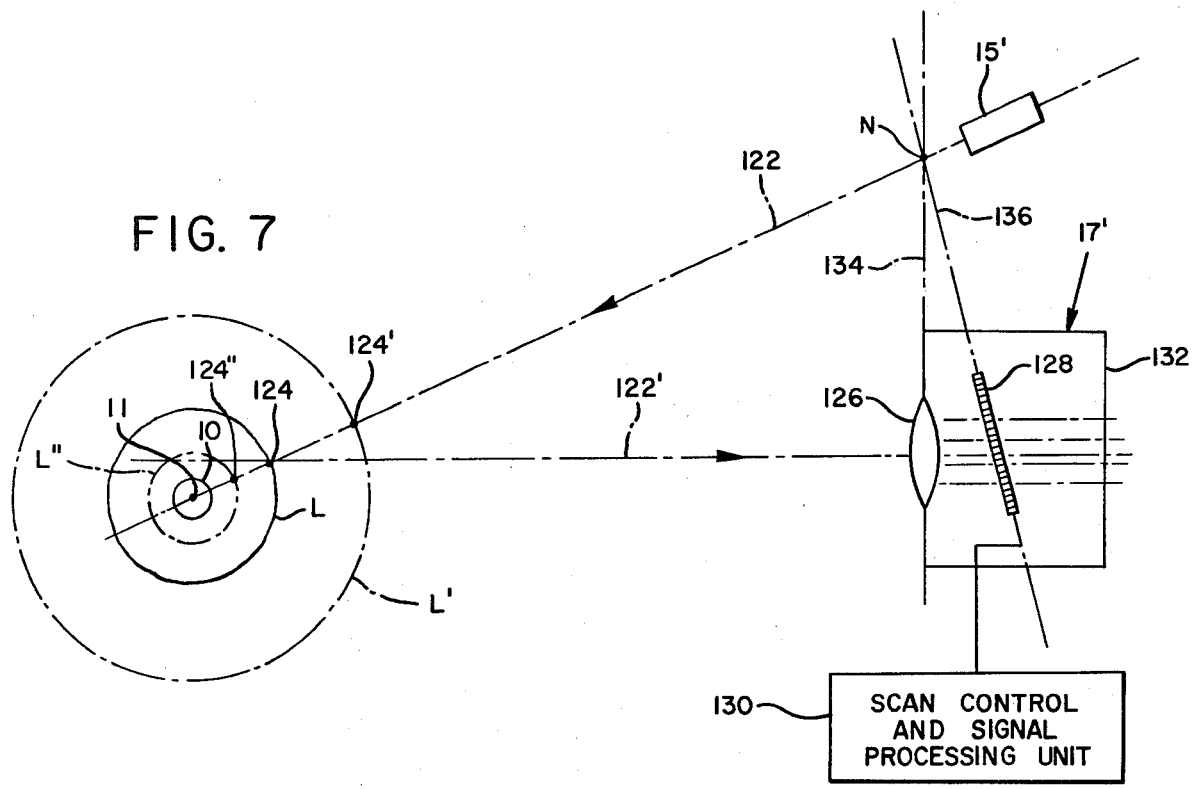
FIG. 7 is a schematic diagram showing another embodiment of the scanning means employed in FIGS. 1 to 6 using light reflection scanning.

A light reflection type scanner may be used in place of a transmission type scanner shown in FIGS. 1–4. The light reflection scanner is shown in FIG. 7 and includes a laser light source 15' which emits a narrow beam 122 of light which is directed into contact with the surface of the log L at point 124. The light beam is reflected back from the log along light path 122' to a photoelectric detector 17' through a lens 126. The photodetector includes linear array 128 of photosensitive PN junction diodes only a portion of which are illuminated by the light beam with the position of the illuminated portion being proportional to the distance of the measuring point 124 on the log from a common intersection point N and to the diameter of the log at such measuring point. The planes 134 and 136 of the lens 126 and the detector array 128 intersect the light beam 122 at the common intersection point N. The distance from N to spindle center 11 is fixed during scanner installation. The array 128 is electronically scanned by a scan control and signal processing unit 130 in the manner shown in U.S. Pat. No. 4,221,973 of Nosler granted Sept. 9, 1980. It should be noted that the lens 126 and the photodiode array 128 can be mounted within a housing 132 separate from the laser light source 15'. However, such laser light source is supported on the exterior of housing 132 at a predetermined angle with respect to the plane 134 of the lens which forms a right angle with the axis 122' of lens 126. It should be noted that the light beam 122 emitted by the laser 15' intersects the plane 136 of the photodiode array 128 at a greater angle. In one example where the distance between the lens 126 and the surface of the log L" of minimum diameter is approximately 5 feet, the angle between the incident light beam 122 and the reflected light beam 122' which corresponds with the axis of lens 126, is approximately 14.5°. This angle provides a dynamic range of about 20 inches for measuring logs of different diameter in a range between a maximum diameter L' of about 4 feet and a minimum diameter L" of about 6 inches while maintaining the reflection point 124 in focus.

As shown in FIG. 4 a computer system 138 of the type shown in FIG. 9 of U.S. Pat. No. 4,197,888 of McGee et al granted Apr. 15, 1980, may be employed to compute the optimum yield axis of the log. The computer system receives scan read-out signals from a plurality of inputs 140 connected to the outputs of the photodetectors 17 which are spaced longitudinally along the length of the log and receives a rotational position signal from input 142 connected to the output of a shaft position encoder 144 which is connected to the lathe spindles 10 to indicate the rotational position of such spindles. The computer system produces an X position output signal on output 146 and a Y position output signal on output 148 corresponding, respectively, to the horizontal and vertical positions of the optimum yield axis of the log, which are supplied to an X motor control 150 and a Y motor control 152. As a result, each of the motor controls 150 and 152 operate the step motor 64 which controls the servo valves 62 for the horizontal positioning motor 66 and the vertical positioning motor 50 in the manner shown in U.S. Pat. No. 4,197,888.

An X position indicating signal input 154 and a Y position indicating input 156 are connected to the computer system 138 from the motor control circuits 150 and 152, respectively, to indicate when the positioning arms 20 have moved the log into the proper position with its optimum yield axis in alignment with the lathe spindle axis 11, and whereby stop further movement of the positioning arms. In addition, the computer system supplies a scan signal output 158 which is applied to a lathe spindle motor control 160 to cause scanning by rotating the spindles one complete 360° revolution while the log is irradiated with the five light beams. The transmitted or reflected light beams are detected by means of the five cameras 17 which are switched on and off to take a reading every 10° to 20° of rotation. The rotational position of each such reading is indicated by the shaft encoder 144. In addition, the computer system produces other outputs which are applied to the spindle cylinders 98 to cause the lathe spindles to advance and retract into and out of engagement with the ends of the log at the proper time. Similar outputs are provided to the clamp cylinders 40 and 114 which move the positioning arms 20 and the transfer arms 106 into and out of engagement with the ends of the log. However, these outputs as well as those controlling the lathe motor 12 during peeling and movement of the knife carriage 82, have not been shown for purposes of simplicity and clarity since they are well known in the art.

It will be obvious to those having ordinary skill in the art that many changes may be made in the details of the above described preferred embodiment of the invention. Therefore, the scope of the present invention should only be determined by the following claims.

I claim:

1. Veneer lathe log scanning and positioning apparatus, comprising:
    lathe spindle means for engaging the opposite ends of a log and for rotating said log about a spindle axis;
    lathe knife means for peeling a sheet of wood veneer from said log as it is rotated by said spindle means about said spindle axis when said knife means is moved into engagement with the side of said log;
    scanning means for scanning said log with electromagnetic radiation as said log is rotated by said spindle means about said spindle axis to determine the optimum yield axis of said log for the optimum production of veneer;
    positioning means for engaging said log after scanning and for adjusting the position of said log after disengaging the spindle means to an aligned position where its optimum yield axis is aligned with the spindle axis;
    control means for causing said spindle means to engage said log prior to and during scanning, for causing said spindle means to disengage from said log after it is engaged by said positioning means, and for causing said spindle means to engage said log in said aligned position;
    and carriage means for moving said knife means into engagement with the side of said log in said aligned position.

2. Apparatus in accordance with claim 1 in which the scanning means scans the log with light to determine said optimum yield axis.

3. Apparatus in accordance with claim 2 in which the scanning means scans the log with a plurality of light beams at scanning positions longitudinally spaced along said log.

4. Apparatus in accordance with claim 3 in which the scanning means includes a plurality of photodetector means positioned to detect different ones of said light beams.

5. Apparatus in accordance with claim 4 in which the photodetector means detect reflected light beams which are reflected from the surface of said log.

6. Apparatus in accordance with claim 4 in which the photodetector means detect transmitted light beams which are transmitted past the side of said log to form a shadow image of said log on said photodetector means.

7. Apparatus in accordance with claim 1 in which the positioning means including positioning arms which adjust both ends of the log in two different directions to move the log into said aligned position.

8. Apparatus in accordance with claim 7 in which the positioning arms each have gripping means which engages the end of the log at a location spaced from the spindle means, said positioning arms being mounted for longitudinal movement along the spindle axis into and out of engagement with the log end.

9. Apparatus in accordance with claim 7 in which the positioning arms are each mounted on a support means which is pivoted vertically about a pivot means by a vertical positioning motor, and in which said pivot means is moved horizontally by a horizontal positioning motor to adjust the log into said aligned position.

10. Apparatus in accordance with claim 9 in which the support means includes a pair of support arms which are mounted at one end to a sliding pivot means for horizontal sliding movement and vertical pivoting of said support arms.

11. Apparatus in accordance with claim 10 in which the longitudinal movement of each positioning arm is provided by a cylinder and is guided by guide means supported by said support means.

12. Apparatus in accordance with claim 11 in which the support means for each positioning arm includes an outer support tube attached to the support arms and an inner support tube which slides within said outer support tube and is attached at one end to the positioning arm, said positioning arm being moved longitudinally by the cylinder which is mounted within said inner support tube and connected to said positioning arm.

13. Apparatus in accordance with claim 1 in which transfer arms transfer the log to the lathe spindle means from a remote position where the log is rough centered.

14. Log scanning and positioning apparatus, comprising:
spindle means for engaging the opposite ends of a log for rotating said log about a spindle axis;
scanning means for scanning said log with light as the log is rotated by said spindle means to determine the optimum yield axis of said log;
positioning means for adjusting the position of said log after scanning and disengagement of said spindle means to an aligned position where said optimum yield axis is aligned with said spindle axis, said positioning means including positioning arms of fixed length which engage said log after scanning; and
control means for causing said spindle means to engage said log prior to and during scanning, for causing said spindle means to disengage from said log after it is engaged by said positioning arms and for causing said spindle means to engage said log in said aligned position.

15. Apparatus in accordance with claim 14 in which the positioning means includes motor means for adjusting each of the positioning arms in two different directions to move the log into said aligned position.

16. Apparatus in accordance with claim 15 in which each of the positioning arms has a gripping means which engages the end of the log at a location spaced from the spindle means, said positioning arms being mounted for longitudinal movement along the spindle axis into and out of engagement with the log end.

17. Apparatus in accordance with claim 14 in which the positioning arms are each mounted on a support means for pivoting about a pivot means.

18. Apparatus in accordance with claim 17 in which the pivot means is mounted for sliding movement so that said positioning arms are each moved into two different directions.

19. Apparatus in accordance with claim 18 in which the support means includes support arms of fixed length which are each pivoted vertically about said pivot means by a vertical positioning motor, and in which said pivot means is slid horizontally by a horizontal positioning motor to adjust the log into said aligned position.

20. Apparatus in accordance with claim 19 in which the longitudinal movement of each positioning arm is provided by a cylinder and is guided by guide means supported by said support means.

21. Apparatus in accordance with claim 20 in which the support means for each positioning arm includes an outer support tube attached to the support arms and an inner support tube which slides within said outer support tube and is attached at one end to a positioning arm, said positioning arm being moved longitudinally by the cylinder which is mounted within said inner support tube and connected to said positioning arm.

* * * * *

UNITED STATES PATENT AND TRADEMARK OFFICE
CERTIFICATE OF CORRECTION

PATENT NO. : 4,397,343
DATED      : August 9, 1983
INVENTOR(S): FRED W. FIELDS

It is certified that error appears in the above—identified patent and that said Letters Patent is hereby corrected as shown below:

Column 3, line 32 "socket 18" should be --sprocket 18--.

Column 3, line 53 "arm" should be --arms--.

Column 5, line 11, insert "between" after "ratio".

Column 5, line 17 "advice" should be --advance--.

Column 8, line 4, "whereby" should be --thereby--.

Claim 18, line 32 "into" should be --in--.

Claim 21, line 48 "a" should be --the--.

Signed and Sealed this

Twentieth Day of December 1983

[SEAL]

Attest:

Attesting Officer

GERALD J. MOSSINGHOFF

Commissioner of Patents and Trademarks